(12) United States Patent
Dusa, II

(10) Patent No.: US 11,142,232 B2
(45) Date of Patent: Oct. 12, 2021

(54) PALLET JACK ASSEMBLY

(71) Applicant: James Dusa, II, Petersburg, MI (US)

(72) Inventor: James Dusa, II, Petersburg, MI (US)

( * ) Notice: Subject to any disclaimer, the term of this patent is extended or adjusted under 35 U.S.C. 154(b) by 0 days.

(21) Appl. No.: 16/982,364

(22) PCT Filed: Mar. 28, 2019

(86) PCT No.: PCT/US2019/024514
§ 371 (c)(1),
(2) Date: Sep. 18, 2020

(87) PCT Pub. No.: WO2019/191385
PCT Pub. Date: Oct. 3, 2019

(65) Prior Publication Data
US 2021/0031821 A1    Feb. 4, 2021

Related U.S. Application Data

(60) Provisional application No. 62/649,115, filed on Mar. 28, 2018.

(51) Int. Cl.
*B62B 3/06*    (2006.01)
*B62B 5/00*    (2006.01)
*B66F 9/065*   (2006.01)

(52) U.S. Cl.
CPC .......... *B62B 5/0079* (2013.01); *B62B 3/0618* (2013.01); *B62B 2207/04* (2013.01); *B62B 2301/00* (2013.01); *B66F 9/065* (2013.01)

(58) Field of Classification Search
CPC ... B62B 2203/20; B62B 2203/24; B62B 3/02; B62B 3/06; B62B 3/606; B62B 3/0635; B62B 5/0079; B66F 9/065
See application file for complete search history.

(56) References Cited

U.S. PATENT DOCUMENTS

| 2,809,759 | A |   | 5/1956  | Manker   |            |
|-----------|---|---|---------|----------|------------|
| 3,935,954 | A | * | 2/1976  | Woods    | B60P 1/04  |
|           |   |   |         |          | 414/24.5   |
| 4,944,648 | A | * | 7/1990  | Parr     | B60P 1/04  |
|           |   |   |         |          | 280/405.1  |
| 5,584,639 | A | * | 12/1996 | Walker, Jr. | B60P 1/027 |
|           |   |   |         |          | 280/64     |
| 7,326,022 | B2| * | 2/2008  | Brown    | B60P 1/025 |
|           |   |   |         |          | 280/656    |
| 7,976,032 | B1| * | 7/2011  | Dockins  | B62B 3/0618|
|           |   |   |         |          | 280/43.12  |
| 8,056,919 | B1| * | 11/2011 | Huston   | B62B 3/02  |
|           |   |   |         |          | 280/493    |
| 9,505,595 | B1| * | 11/2016 | Smith    | B66F 9/075 |
| 10,974,749| B2| * | 4/2021  | Kuhl     | B62B 3/006 |
| 2001/0008344 | A1 |   | 7/2001 | Lanciaux, Jr. |  |
| 2002/0154982 | A1 |   | 10/2002 | Schedler et al. |  |

(Continued)

*Primary Examiner* — Jeffrey J Restifo
(74) *Attorney, Agent, or Firm* — Charles F. Charpie

(57) ABSTRACT

A pallet jack assembly for use with a pallet jack is provided. The pallet jack assembly includes a tug assembly configured for attachment to a towing vehicle and a frame assembly configured to support the tug assembly. A plurality of caster assemblies is supported by the frame assembly. Each of the caster assemblies is configured to support a wheel. The pallet jack assembly facilitates use of the pallet jack as a hand-powered pallet jack or for towing by a towing vehicle.

18 Claims, 13 Drawing Sheets

(56) References Cited

U.S. PATENT DOCUMENTS

| | | |
|---|---|---|
| 2009/0020369 A1 | 1/2009 | Warachka |
| 2009/0159371 A1 | 6/2009 | Gobyn et al. |
| 2009/0232633 A1* | 9/2009 | Stamps ............... B66F 7/08 |
| | | 414/814 |
| 2010/0089703 A1 | 4/2010 | Gallagher et al. |
| 2012/0139209 A1 | 6/2012 | Weiss |
| 2014/0001723 A1* | 1/2014 | Avery ............... B62B 1/002 |
| | | 280/47.131 |
| 2014/0341688 A1 | 11/2014 | Fox |
| 2015/0246682 A1* | 9/2015 | Avery ............... B62B 1/264 |
| | | 280/47.131 |
| 2016/0325972 A1* | 11/2016 | Taylor ............... B62B 3/06 |
| 2017/0158476 A1 | 6/2017 | Brunckhorst et al. |
| 2017/0240194 A1* | 8/2017 | Kalinowski ............ B62B 3/02 |
| 2017/0341667 A1* | 11/2017 | Kalinowski ............ B62B 3/001 |
| 2018/0022155 A1* | 1/2018 | Davis ............... B62B 5/0089 |
| | | 414/469 |
| 2018/0029623 A1* | 2/2018 | Kalinowski ............ B62B 5/0003 |
| 2020/0094863 A1* | 3/2020 | Parrish ............... B60D 1/665 |
| 2020/0216299 A1* | 7/2020 | Johnson ............... B60D 1/04 |
| 2020/0317244 A1* | 10/2020 | Xia ............... B62B 3/0625 |
| 2020/0376909 A1* | 12/2020 | Shiu ............... B60D 1/54 |
| 2020/0398881 A1* | 12/2020 | Simpson ............... B66F 9/065 |
| 2021/0031821 A1* | 2/2021 | Dusa, II ............... B66F 9/07509 |
| 2021/0053602 A1* | 2/2021 | Kalinowski ............ B62B 3/0631 |

\* cited by examiner

PALLET JACK ASSEMBLY

CROSS-REFERENCE TO RELATED APPLICATIONS

This application claims the benefit of U.S. Provisional Patent Application No. 62/649,115, filed Mar. 28, 2018, the disclosure of which is incorporated herein by reference in its entirety.

BACKGROUND

A pallet jack (also known as a pallet truck, pallet pump, pump truck, dog or jigger) is a tool configured to lift and move pallets. A pallet (also commonly called a skid) is typically configured as a flat transport structure that supports goods in a stable fashion. A pallet can be the structural foundation of a unit load, which allows handling and storage efficiencies. Goods and/or shipping containers are often placed on a pallet and secured with strapping, stretch wrap or shrink wrap, thereby allowing secure shipment. In certain instances, pallets can be constructed from wooden components. However, in other instances, pallets can be constructed from plastic, metal, paper and recycled materials and any combination thereof.

Pallet jacks are a basic form of a forklift and are intended to move heavy or light pallets within a warehouse. A pallet jack is steered by a "tiller" like lever that also acts as the pump handle for raising portions of the pallet jack. A small handle on the tiller can release hydraulic fluid from a hydraulic jack, causing portions of the pallet jack to lower. A pallet jack can have front wheels, typically positioned inside the ends of forks. The front wheels can be mounted on levers that are attached to linkages connected to a jack cylinder.

In operation, as the hydraulic jack at the tiller end is raised, the linkages force the wheels down, raising the forks vertically above the front wheels, raising the load positioned on the forks upward until the load clears the surface of the floor. The forks are only lifted vertically enough to clear the floor surface for subsequent travel. Oftentimes, pallet jacks are used to move and organize pallets inside a trailer, especially when there is no forklift truck access or availability.

It would be advantageous if pallet jacks could be improved.

SUMMARY

It should be appreciated that this Summary is provided to introduce a selection of concepts in a simplified form, the concepts being further described below in the Detailed Description. This Summary is not intended to identify key features or essential features of this disclosure, not is it intended to limit the scope of the pallet jack assembly.

The above objects as well as other objects not specifically enumerated are achieved by a pallet jack assembly for use with a pallet jack. The pallet jack assembly includes a tug assembly configured for attachment to a towing vehicle and a frame assembly configured to support the tug assembly. A plurality of caster assemblies is supported by the frame assembly. Each of the caster assemblies is configured to support a wheel. The pallet jack assembly facilitates use of the pallet jack as a hand-powered pallet jack or for towing by a towing vehicle.

The above objects as well as other objects not specifically enumerated are also achieved by a tug assembly configured for attachment to a dolly. The tug assembly includes a plurality of arm assemblies and a bushing connected to each of the arm assemblies. A tongue assembly has a plurality of opposing nubs configured for insertion into the bushing of each of the arm assemblies. The tongue assembly is supported for rotation by the bushings. Each of the arm assemblies is configured for a first, contracted orientation and a second, extended orientation.

Various aspects of the pallet jack assembly will become apparent to those skilled in the art from the following detailed description of the illustrated embodiments, when read in light of the accompanying drawings.

DETAILED DESCRIPTION

The pallet jack assembly will now be described with occasional reference to the specific embodiments. The pallet jack assembly may, however, be embodied in different forms and should not be construed as limited to the embodiments set forth herein. Rather, these embodiments are provided so that this disclosure will be thorough and complete, and will fully convey the scope of pallet jack assembly to those skilled in the art.

Unless otherwise defined, all technical and scientific terms used herein have the same meaning as commonly understood by one of ordinary skill in the art to which the pallet jack assembly belongs. The terminology used in the description of the pallet jack assembly herein is for describing particular embodiments only and is not intended to be limiting of the pallet jack assembly. As used in the description of the pallet jack assembly and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the pallet jack attachment. Notwithstanding that the numerical ranges and parameters setting forth the broad scope of the pallet jack assembly are approximations, the numerical values set forth in the specific examples are reported as precisely as possible. Any numerical values, however, inherently contain certain errors necessarily resulting from error found in their respective measurements.

The description and figures disclose a pallet jack assembly fitted to a conventional hand-powered pallet jack. Generally, the pallet jack assembly is configured to provide improved operation of the conventional hand-powered pallet jack. Optionally, the pallet jack assembly can include a parking brake. When engaged, the optional parking brake is configured to substantially prevent rolling movement of the modified pallet jack.

The term "pallet jack", as used herein, is defined to mean any structure, mechanism or device configured to lift and move pallets. The term "pallet", as used herein, is defined to mean any structure, mechanism or device configured to support goods in a stable fashion while moving or storing the goods.

Figure 1:
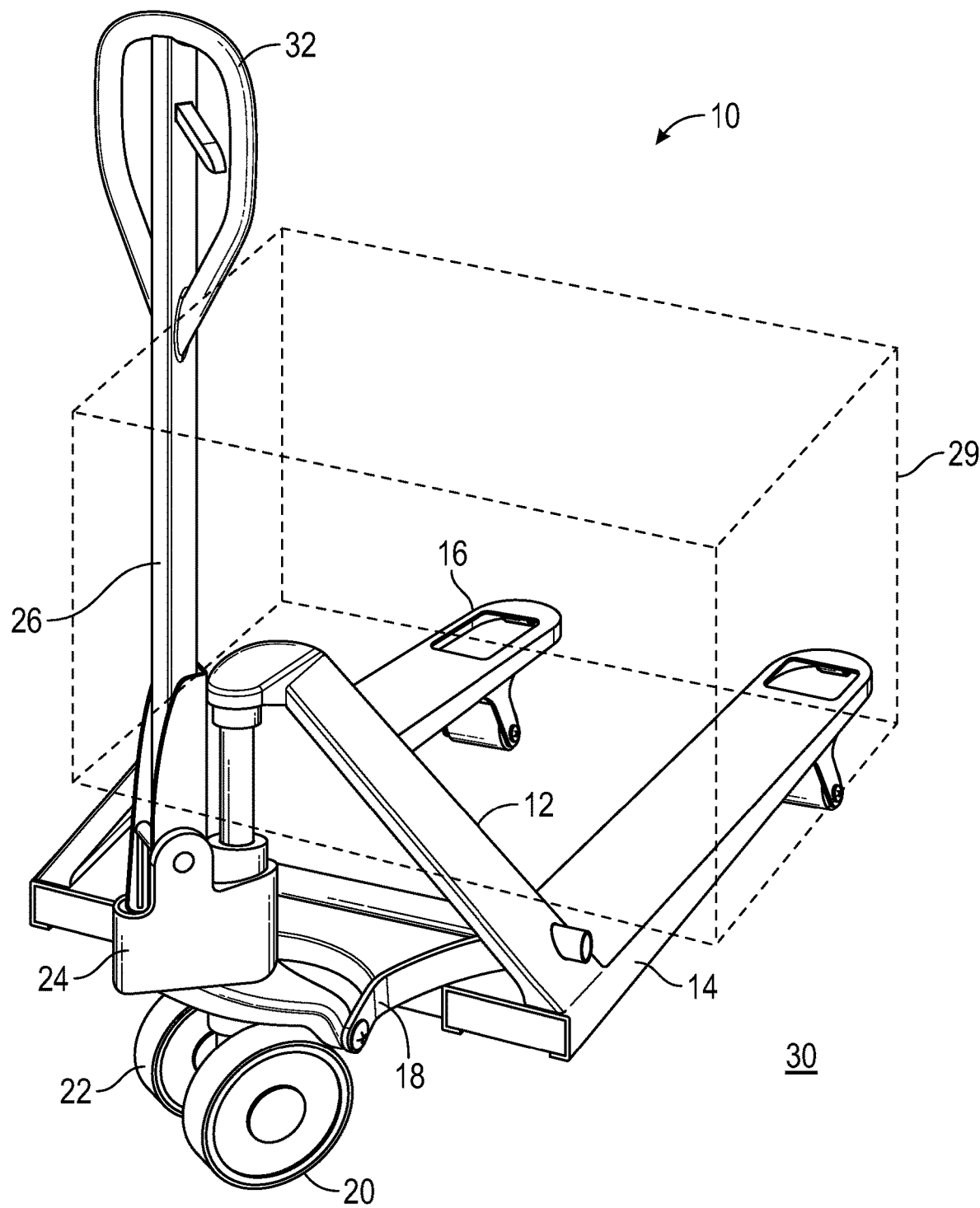
FIG. 1 is a perspective view of a conventional pallet jack.

Referring now to FIG. 1, one non-limiting embodiment of a conventional pallet jack is shown at 10. The pallet jack 10 is conventional in the art and will only be briefly described herein. In certain instances, the pallet jack 10 is configured to lift and move loads, such as the non-limiting example of a pallet having a load. The pallet jack 10 includes a framework 12 attached to a plurality of forks 14, 16 extending in a direction away from the framework 12, a plurality of torsion segments 18 configured to support one or more steerable wheels 20, 22, a pump unit 24 and a tow bar 26 configured to activate the pump unit 24.

Referring again to FIG. 1, in operation, movement of the tow bar 26 serves to actuate the pump unit 24, thereby forcing hydraulic fluid to raise the forks 14, 16, such that the load (shown schematically in phantom at 29) positioned on the forks 14, 16 is raised above a surface 30 of the ground. A handle 32 located adjacent the tow bar 26 is in fluid communication with the pump unit 24 and is configured to release hydraulic fluid, thereby causing the forks 14, 16 to lower. In the embodiment illustrated in FIG. 1, the forks 14, 16 have a length L1 in a range of from about 24.0 inches to about 84.0 inches.

Figure 2:
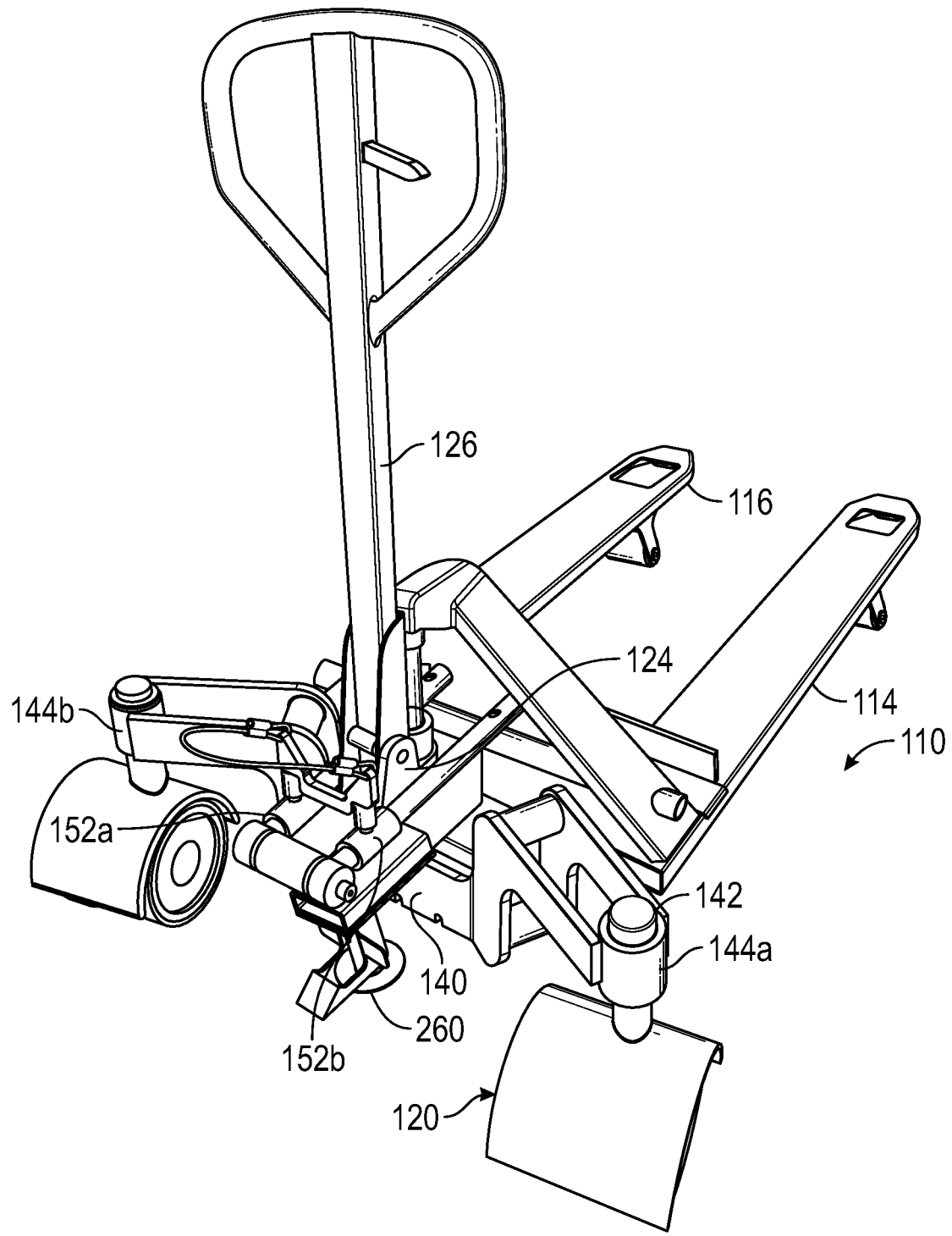
FIG. 2 is a side perspective view of the conventional pallet jack of FIG. 1 equipped with a pallet jack assembly, thereby forming a modified pallet jack.
Figure 3:
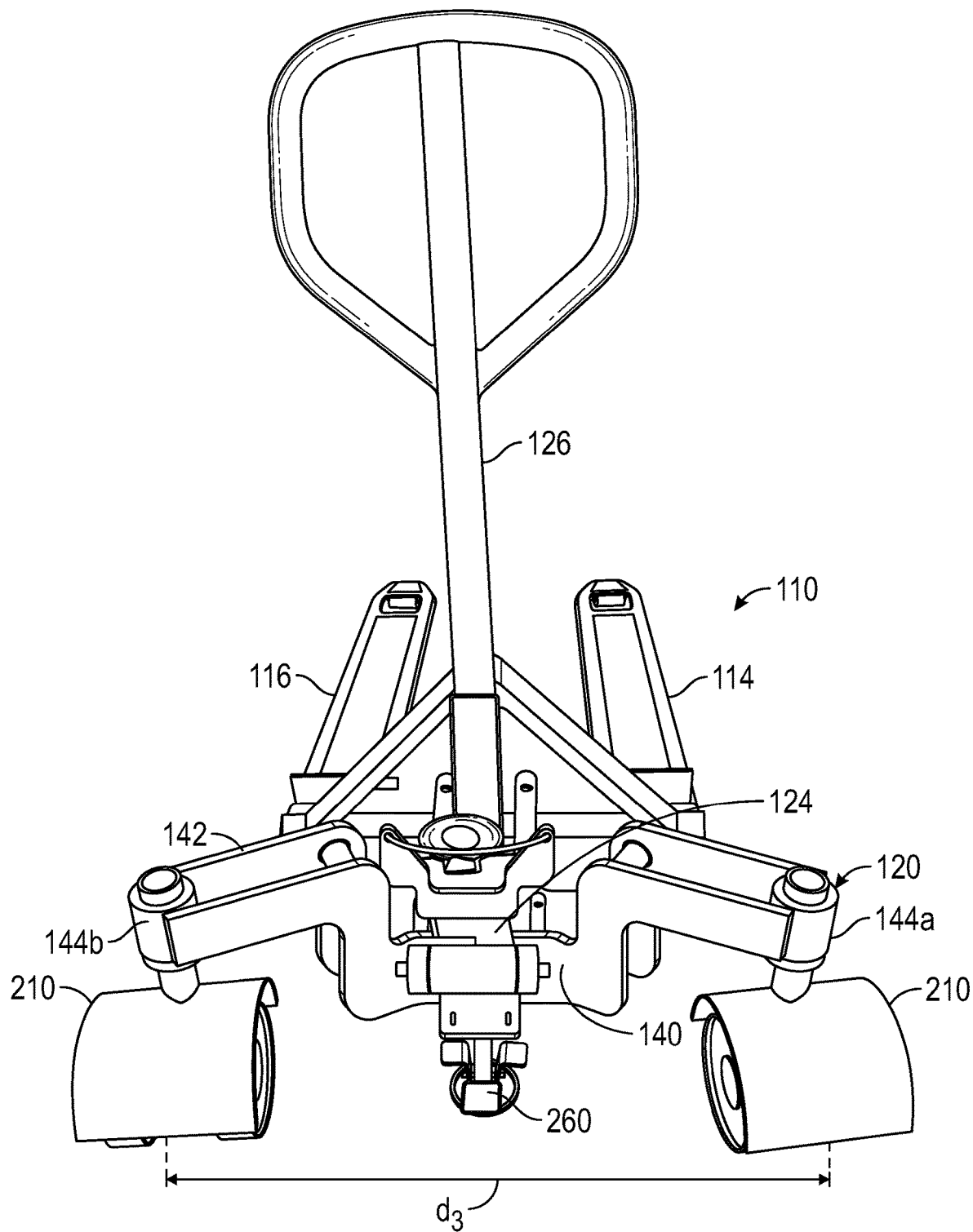
FIG. 3 is a rear perspective view of the modified pallet jack of FIG. 2.
Figure 4:
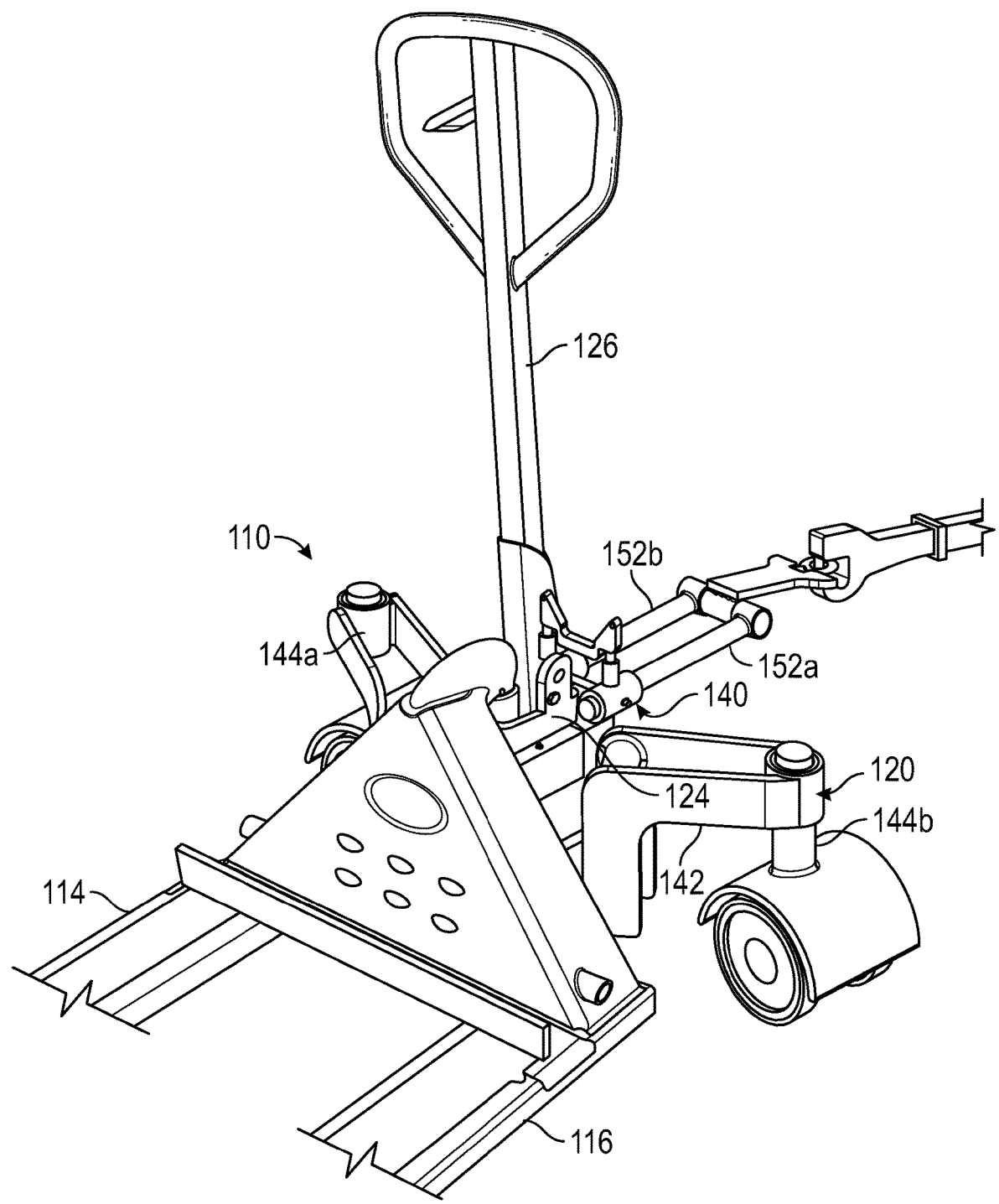
FIG. 4 is a side perspective view of the modified pallet jack of FIG. 2 shown arranged for towing by a towing vehicle.

Referring now to FIGS. 2-4, a pallet jack assembly 120 has been fitted to the pallet jack 10 shown in FIG. 1, thereby forming a modified pallet jack, illustrated generally at 110. As will be discussed in more detail below, the modified pallet jack 110 advantageously improves operation of the conventional hand-powered pallet jack 10 to an extent that the modified pallet jack 110 can be used in place of more costly forklift machines (not shown).

Referring now to FIGS. 2-4, the modified pallet jack 110 includes the pallet jack assembly 120, a plurality of forks 114, 116 and a pump unit 124. A tow bar 126 is configured to activate the pump unit 124. In the illustrated embodiment, the plurality of forks 114, 116, pump unit 124 and the tow bar 126 are the same as, or similar to, the plurality of forks 14, 16, pump unit 24 and the tow bar 26 illustrated in FIG. 1 and described above. However, in other embodiments, the plurality of forks 114, 116, pump unit 124 and the tow bar 126 can be different from the plurality of forks 14, 16, pump unit 24 and the tow bar 26.

Referring now to FIGS. 2-5, the pallet jack assembly 120 includes a tug assembly 140, a frame assembly 142 and a plurality of caster assemblies 144a, 144b.

Figure 6A:
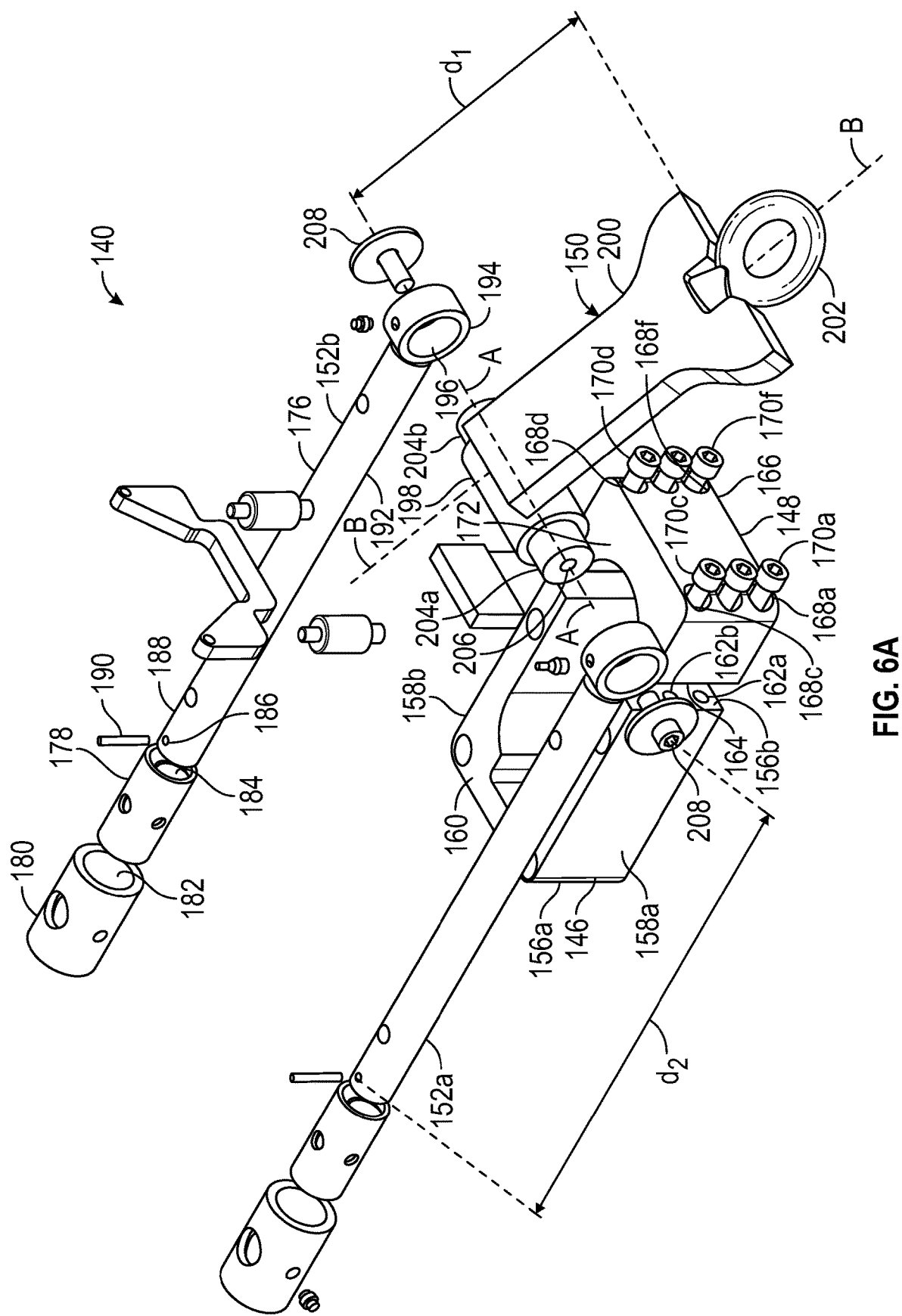
FIG. 6A is a side perspective view of a tug assembly of the pallet jack assembly of FIG. 5.

Referring now to FIG. 6A, the tug assembly 140 is illustrated. The tug assembly 140 is configured for several functions. First, the tug assembly 140 is configured to provide a secure attachment to the conventional pallet jack 10 as shown in FIG. 2-4. Second, the tug assembly 140 is configured for attachment to the frame assembly 142a. Third, the tug assembly 140 is configured to support an extendable tongue assembly for attachment to a conventional towing vehicle 140. Finally, the tug assembly 140 is configured to limit the turn angle of the pallet jack assembly 120.

Referring again to FIG. 6A, the tug assembly 140 includes an attachment framework 146, a mounting block 148, a rotatable and extendable tongue assembly 150 and a plurality of opposing arm assemblies 152a, 152b.

Referring again to FIG. 6A, the attachment framework 146 includes first and second end plates 156a, 156b and first and second side plates 158a, 158b. The end plates 156a, 156b and the side plates 158a, 158b cooperate to form a box-like structure having a major surface 160. The major surface 160 is configured to receive and attach to portions of the pump unit 124 (not shown for purposes of clarity) of a conventional pallet jack 10. In the illustrated embodiment, the first and second end plates 156a, 156b and first and second side plates 158a, 158b are formed from one or more structural steel materials. In alternate embodiments, the first and second end plates 156a, 156b and first and second side plates 158a, 158b can be formed from other materials sufficient for the functions described herein.

Referring again to FIG. 6A, the end plate 156b has a substantially flat surface and includes a plurality of threaded apertures 162a-162f (only apertures 164a and 164b are shown for purposes of clarity). The threaded apertures 162a-162f will be discussed in more detail below.

Referring again to FIG. 6A, the mounting block 148 is configured for several functions. First, the mounting block 148 is configured for attachment to the end plate 156b of the attachment framework 146. Second, the mounting block 148 is configured to support the tongue assembly 150 and the arm assemblies 152a, 152b. The mounting block 148 includes a first block end 164 and an opposing block end 166. The first block end 164 has a substantially flat surface configured to seat against the end plate 156b.

Referring again to FIG. 6A, a plurality of block apertures 168a-168f extend from the first block end 164 to the opposing block end 166. The block apertures 168a-168f are configured to receive a plurality of threaded block fasteners 170a-170f in a manner such that the threaded block fasteners 170a-170f engage the threaded apertures 168a-168f in the end plate 156b and secure the mounting block 148 to the attachment framework 146. In the illustrated embodiment, the threaded block fasteners 170a-170f are socket head fasteners. However, in other embodiments, the threaded block fasteners 170a-170f can be other structures, mechanisms and devices, such as the non-limiting examples of clips and clamps, sufficient to secure the mounting block 148 to the attachment framework 146.

Referring again to FIG. 6A, the mounting block 148 includes a top surface 172 that extends from the first block end 164 to the opposing block end 166. The top surface 172 of the mounting block 148 will be discussed in more detail below.

Referring again to FIG. 6A, the arm assembly 152b is representative of the arm assembly 152a. The arm assembly 152b includes a slide segment 176, a first bearing 178 and a first guide member 180. The first guide member 180 is attached to the top surface of the mounting block 148. In the illustrated embodiment, the first guide member 180 is attached to the mounting block 148 by welding; however, other manners and structures can be used to attach the first guide member 180 to the mounting block 148. The first guide member 180 includes an aperture 182 extending therethrough and is configured to receive the first bearing 178 and the slide segment 176 in a manner such that the slide segment 176 can move in an axial direction. In the illustrated embodiment, the first guide member 180 is formed from one or more metallic materials and has a tubular form. However, in other embodiments, the first guide member 180 can be other structures, mechanisms and devices, such as the non-limiting examples of clips and clamps, sufficient to secure the mounting block 148 to the attachment framework 146 and facilitate axial movement of the slide segment 176.

Referring again to FIG. 6A, the first bearing 178 is fitted to the first guide member 180 within the aperture 182. The first bearing 178 includes an aperture 184 configured to receive the slide segment 176 and further configured to facilitate axial movement of the slide member 176 with reduced axial friction. In the illustrated embodiment, the first bearing 178 is a bronze bearing, however other structures, mechanisms and devices can be used to facilitate axial movement of the slide structure 176.

Referring again to FIG. 6A, the slide member 176 is configured for axial movement within the first bearing 178. The slide member 176 includes an aperture 186 at a first end 188. The aperture 186 is configured to receive a first stop member 190. The first stop member 190 is configured to prevent axial movement of the first end 188 of the slide member 176 beyond the first guide member 180 as the slide member 176 moves in a direction toward the mounting block 148. In the illustrated embodiment, the first stop member 190 is a roll pin. In alternate embodiments, the first stop member 190 can be other structures, such as for example the non-limiting example of a clip, sufficient to prevent axial movement of the first end 188 of the slide member 176 beyond the first guide member 180 as the slide member 176 moves in a direction toward the mounting block 148.

Referring again to FIG. 6A, the slide member 176 includes a second end 192 having a bushing 194 attached thereto. The bushing 194 includes an aperture 196. The bushing 194 and the aperture 196 will be discussed in more detail below.

Referring again to FIG. 6A, the tongue assembly 150 includes an axle portion 198, an extension segment 200 and a connection segment 202. The axle portion 198 includes opposing and axially aligned nubs 204a, 204b. The nubs 204a, 204b have a circular cross-section in a manner such as to form a rotatable member within the apertures of the bushings 194 of the slide members 152a, 1652b. The axle portion 198 and the bushings 194 of the slide members 152a, 152b cooperate to facilitate rotation of the tongue assembly 150 about an axis A-A extending axially through the nubs 204a, 204b.

Referring again to FIG. 6A, each of the nubs 204a, 204b has a threaded aperture 206. The threaded aperture 206 is configured to receive a threaded fastener 208. The threaded fastener 208 is configured to secure the nubs 204a, 204b within the apertures 196 of the bushings 194 of the slide members 152a, 152b in a manner that facilitates rotational movement of the tongue assembly 150 about the axis A-A. In the illustrated embodiment, the threaded fasteners 208 are socket head screws. However, in other embodiments, the threaded fasteners 208 can be other structures, mechanisms or devices sufficient to secure the nubs 204a, 204b within the apertures 196 of the bushings 194 of the slide members 152a, 152b in a manner that facilitates rotational movement of the tongue assembly 150 about the axis A-A.

Referring again to FIG. 6A, the extension segment 200 extends from the axle segment 198 to the connection segment 202. The extension segment 200 is configured to extend the connection segment 202 a distance d1 from the axle segment 198 in order to provide turning clearance for the frame assembly 142. In the illustrated embodiment, the distance d1 is in a range of from about 6.0 inches to about 12.0 inches. However, in other embodiments, the distance d1 can be less than about 6.0 inches or more than about 12.0 inches, sufficient to provide turning clearance for the frame assemblies 142.

Referring again to FIG. 6A, the connection segment 202 extends from the extension segment 200 and is configured for attachment to a conventional towing vehicle 140. In the illustrated embodiment, the connection segment 202 has the form of an eyebolt. It is also contemplated that in other embodiments, the connection segment 202 can be other structures and can have other forms sufficient for attachment to a conventional towing vehicle 140. The tongue assembly 150 has a longitudinal axis B-B.

Figure 6B:
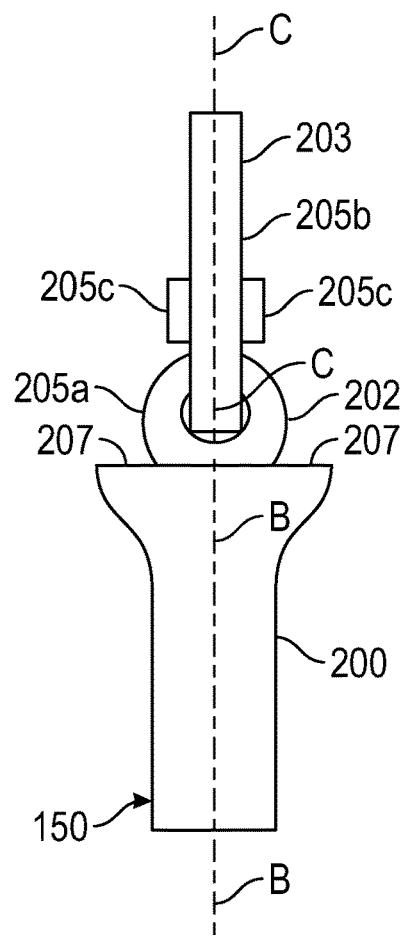
FIG. 6B is a plan view of the tongue assembly of FIG. 6A shown in a first orientation with a hitch.
Figure 6C:
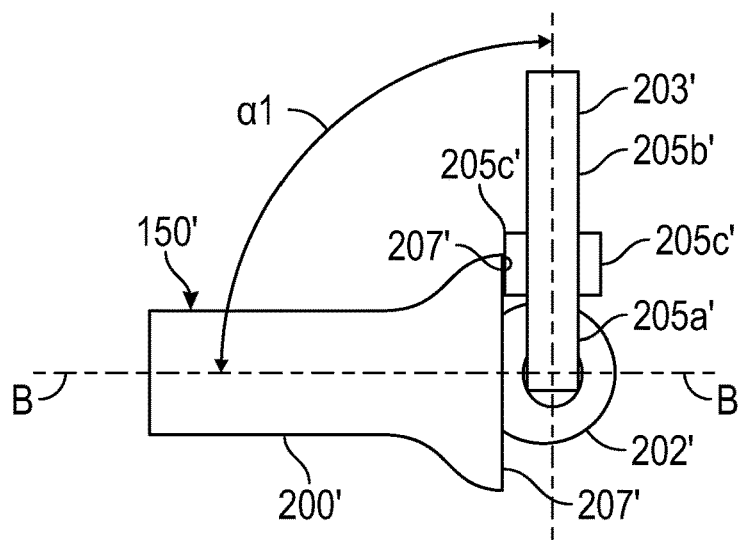
FIG. 6C is a plan view of the tongue assembly of FIG. 6A shown in a second orientation with a hitch.

Referring now to FIGS. 6B and 6C, the connection segment 202 of the tongue assembly 150 is illustrated in an attached arrangement to a hitch 203 of a towing vehicle (not shown for purposes of clarity). The hitch 203 includes a ring portion 205a extending from an extension portion 205b. A plurality of stop segments 205c extend from the extension portion 205b. The hitch 203 has a longitudinal axis C-C. In the illustrated embodiment, the hitch 203 is a pintle-style hitch as is known in the art. However, in other embodiments, the hitch 203 can have other forms.

Referring now to FIG. 6B, the connection segment 202 of the tongue assembly 150 and the hitch 203 are shown in a first orientation. The first orientation occurs when the modified pallet jack 110 is towed by a towing vehicle in a relatively straight line. In the first orientation, the longitudinal axis B-B of the tongue assembly 150 is substantially parallel to the longitudinal axis C-C of the hitch 203.

Referring now to FIG. 6C, the connection segment 202' of the tongue assembly 150' and the hitch 203' are shown in a second orientation. The second orientation occurs as the modified pallet jack 110' is towed by a towing vehicle in a turn having a relatively tight radius. In the second orientation, the longitudinal axis B-B of the tongue assembly 150' forms an angle α1 with the longitudinal axis C-C of the hitch 203'. The turn radius between the longitudinal axis B-B of the tongue assembly 150' and the longitudinal axis C-C of the hitch 203' is limited by the contact a face 207' of the tongue assembly 150' with one of the stop segments 205c'. The angle α1 advantageously prevents folding of the modified pallet jack 110' with the towing vehicle in a manner that resembles the acute angle of a folding pocket knife (commonly referred to as jack knifing) Advantageously, as the turn radius decreases, the contact of a face 207' with one of the stop segments 205c' results in a lateral movement of the modified pallet jack 110' rather than a jack knife arrangement. In the illustrated embodiment, the maximum angle α1 is 90°. However, in other embodiments, the maximum angle α1 can be less than 90°, sufficient to prevent folding of the modified pallet jack 110' with the towing vehicle.

Referring now to FIGS. 2 and 4, the arm assemblies 152a, 152b are extendable from a contracted arrangement (as shown in FIG. 2) to an extended arrangement (as shown in FIG. 4). In the contracted arrangement, the second end 192 of each of the slide segments 176 is positioned within the aperture 182 of the first guide member 180. In the contracted arrangement, the modified pallet jack 110 can be used in a manual mode. In the extended arrangement, the first end 18 of each of the slide segments 176 is positioned within the aperture 182 of the first guide member 180 in a manner such that the extension members arm assemblies 152a, 152b extend in an outward direction from the pallet jack attachment 120. In the extended arrangement, the connection segment 202 can be connected to a towing vehicle 140.

Referring again to FIG. 6, each of the arm assemblies 152a, 152b has an extension distance d2. In the illustrated embodiment, the distance d2 is in a range of from about 6.0 inches to about 24.0 inches. However, in other embodiments, the distance d2 can be less than about 6.0 inches or more than about 24.0 inches, sufficient to provide the functions described herein.

Figure 7:
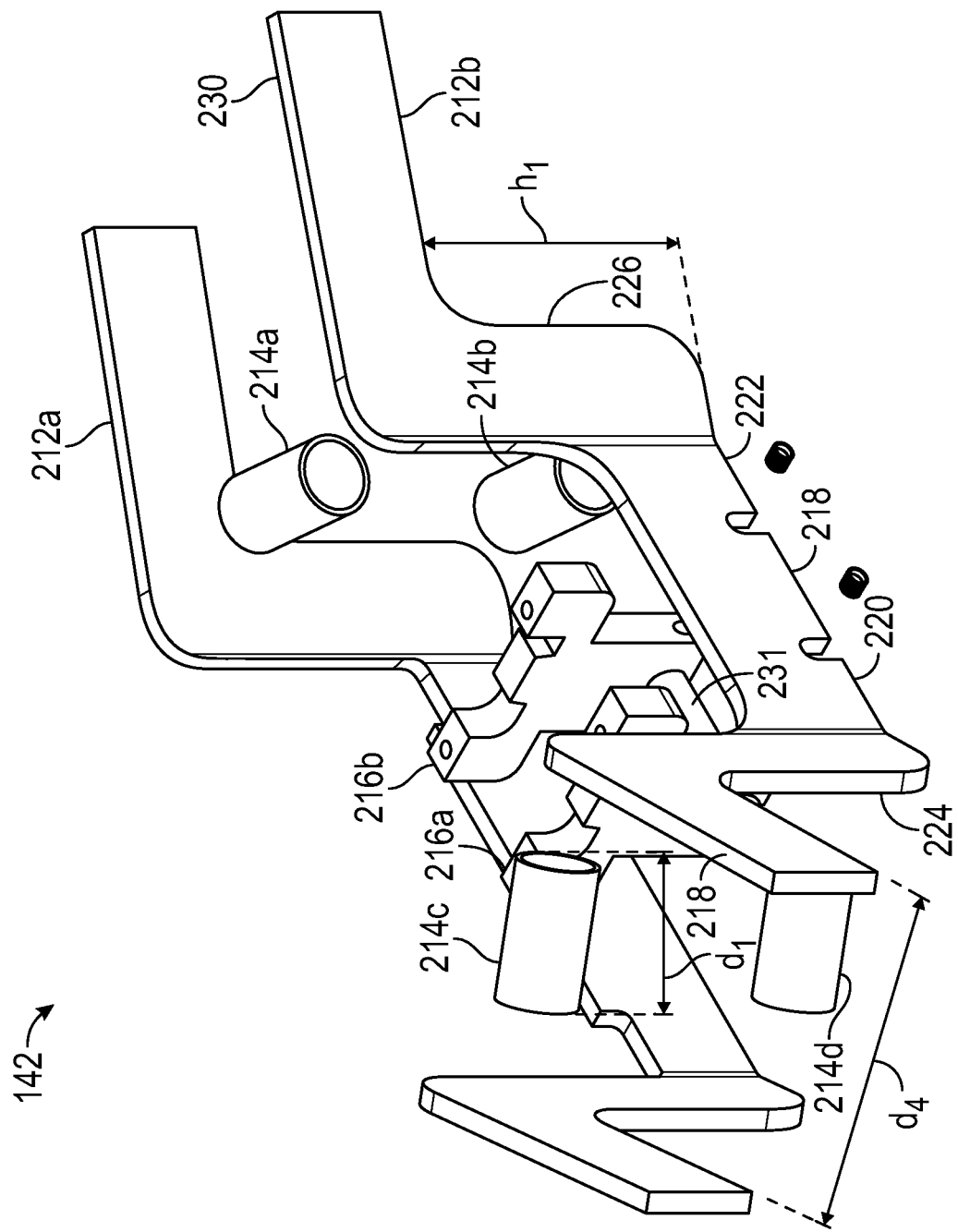
FIG. 7 is a side perspective view of a frame assembly of the pallet jack assembly of FIG. 5.

Referring now to FIG. 7, the frame assembly 142 is illustrated. The frame assembly 142 is configured for several functions. First, the frame assembly 142 is configured to support and attach to the tug assembly 140. Second, the frame assembly 142 is configured to support the plurality of caster assemblies 144a, 144b. Third, the frame assembly 142 is configured to provide a distance d3 between spaced apart wheels 210, as shown in FIG. 3. Finally, the frame assembly 142 is configured for connection to a portion of the pump unit 24.

Figure 8:
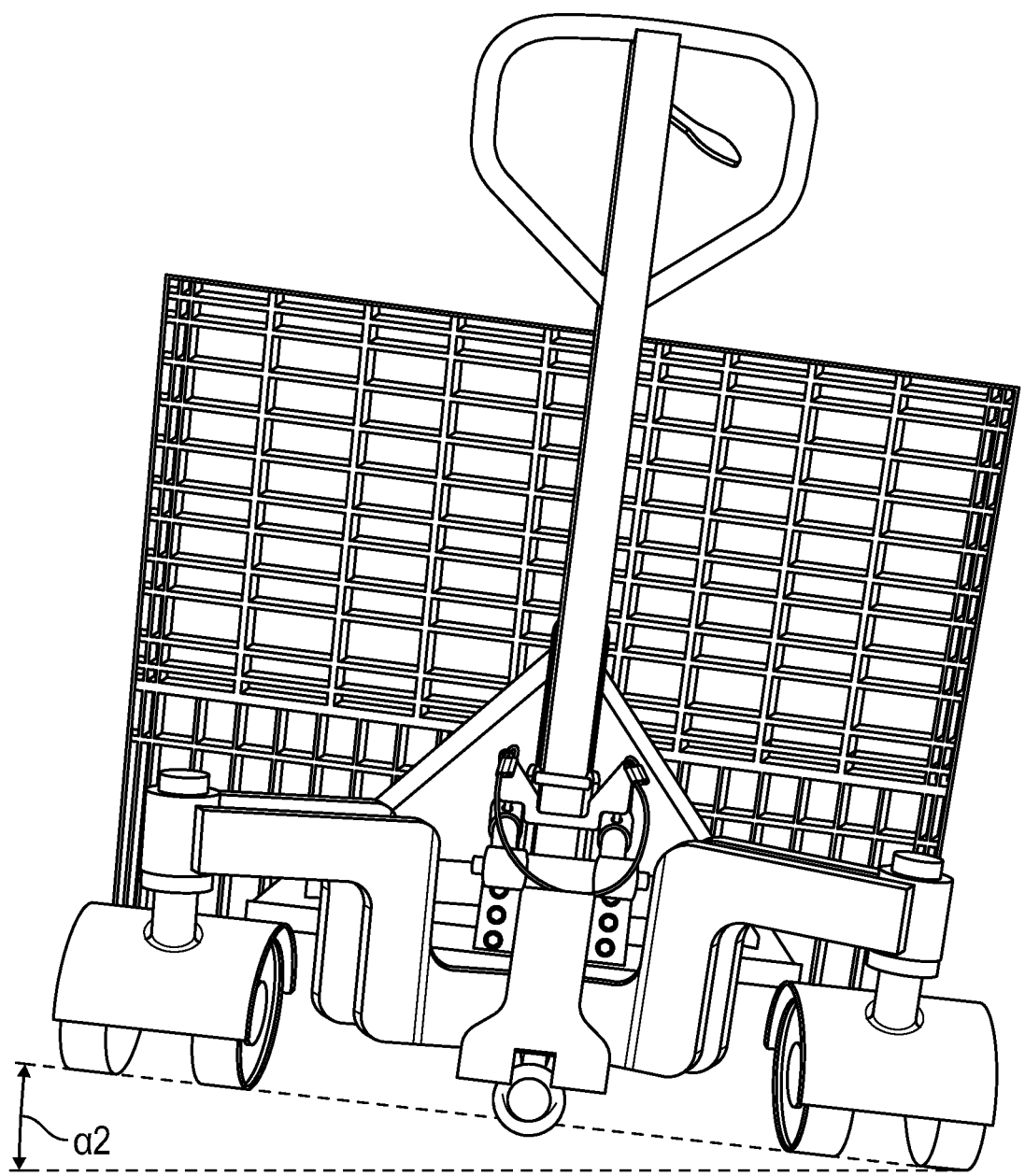
FIG. 8 is rear perspective view of the modified pallet jack of FIG. 2 shown in a tilted arrangement with respect to a generally horizontal surface.

Referring now to FIGS. 3, 7 and 8, the distance d3 is configured to provide stability to the modified pallet jack 110 in a manner such as to substantially prevent tipping of the modified pallet jack 110, even at an exaggerated tilt angle α2 of 20° relative to a substantially horizontal surface as shown in FIG. 8. The distance d3 is further configured to enhance the handling of the modified pallet jack 110. In the illustrated embodiment, the distance d3 is in a range of from about 18.0 inches to about 36.0 inches. However, in other embodiments, the distance d3 can be less than about 18.0 inches or more than about 36.0 inches, sufficient to provide the functions described herein. Finally, the spaced apart wheel 210 are configured to allow operation of the modified pallet jack 110 without the risk of binding the operator within the modified pallet jack 110 due to a jackknife situation.

Referring again to FIG. 7, the frame assembly 142 includes opposing side frames 212a, 212b, a plurality of spacing members 214a-214d and a plurality of support blocks 216a, 216b. The side frame 212b is representative of the side frame 212a. The side frame 212b includes a center section 218 having a first end 220 and an opposing second end 222. A first riser section 224 extends in a substantially vertical direction from the first end 220 of the center section 218 and a second riser section 226 extends in a substantially vertical direction from the second end 222 of the center section 218. Each of the first and second riser sections 224, 226 have a height H1. The height H1 is configured to provide clearance for a caster assembly 144a, 144b in combination with a wheel 210. In the illustrated embodiment, the distance h1 is in a range of from about 8.0 inches to about 24.0 inches. However, in other embodiments, the distance h1 can be less than about 8.0 inches or more than about 24.0 inches, sufficient to provide clearance for a caster assembly 144a, 144b in combination with a wheel 210.

Referring again to FIG. 7, the side frame 212b includes a first extension arm 228 extending from the first riser section 224 in a generally horizontal direction and an opposing second extension arm 230 extending from the second riser section 226 in a generally horizontal direction. As will be described in more detail below, the side frames 212a, 212b cooperate to structurally support the caster assembly 144a, 144b. In the illustrated embodiment, the side frames 212a, 212b are formed from metallic materials, such as for example, hot rolled steel having a thickness in a range of from about 0.25 inches to about 0.75 inches. It is contemplated that in other embodiments, the side frames 212a, 212b can be formed from materials or combination of materials and can have other thickness sufficient to structurally support the caster assembly 144a, 144b.

Referring again to FIG. 7, each of the spacing members 214a-214d have a length L1 are configured to space apart the side frames 212a, 212b a distance d4. The distance d4 is configured such that the corresponding extension arms 230 of the opposing side frames 212a, 212b can receive portions of the caster assembly 144a, 144b. In the illustrated embodiment, the length L1 and the distance h1 are in a range of from about 3.0 inches to about 8.0 inches. However, in other embodiments, the length L1 and the distance h1 can be less than about 3.0 inches or more than about 8.0 inches, sufficient such that the corresponding extension arms 230 of the opposing side frames 212a, 212b can receive portions of the caster assembly 144a, 144b. In the illustrated embodiment, the spacing members 214a-214d are metallic, tubular structures having an outer diameter of about 2.0 inches. However, in other embodiments, the spacing members 214a-214d can be formed from other materials and can other desired dimensions.

Referring again to FIG. 7, each of the support blocks 216a, 216b is positioned between the opposing side frames 212a, 212b and is attached to the center sections 218. The support blocks 216a, 216b are configured to seat against and attach to the mounting block 148 of the tug assembly 140. The support blocks 216a, 216b can have any desired structure sufficient to seat against and attach to the mounting block 148 of the tug assembly 140.

Referring again to FIG. 7, a pin 231 extends between the support blocks 216a, 216b. The pin 231 is configured for insertion into a portion (not shown for purposes of clarity) of the pump unit 24 extending in a downward direction. In an installed position, the pin 231 is configured to attach the pallet jack assembly 110 to the pump unit 24 in a manner that provides structural rigidity to the modified pallet jack 110. In the illustrated embodiment, the pin 231 has the form of a metallic dowel. However, in other embodiments, the pin 231 can have other forms sufficient to attach the pallet jack assembly 110 to the pump unit 24 in a manner that provides structural rigidity to the modified pallet jack 110.

Figure 9:
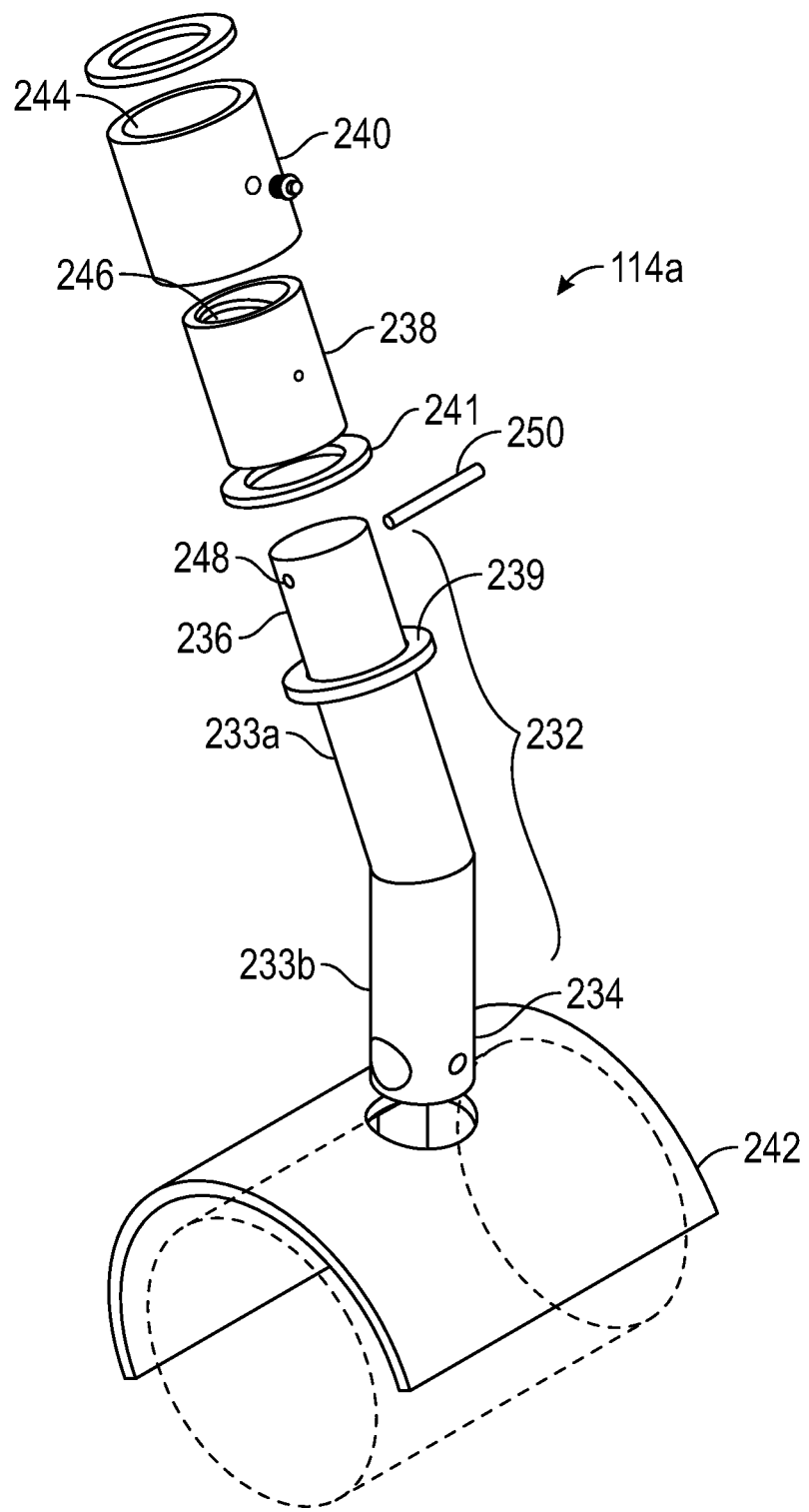
FIG. 9 is a side perspective view of a caster assembly of the pallet jack assembly of FIG. 5.

Referring now to FIG. 9, a caster assembly 144a is illustrated. The caster assembly 144a is representative of the caster assembly 144b. The caster assembly 144a is configured to extend in a downward direction from the corresponding extension arms 228, 230 of the opposing frame assemblies 142a, 142b and is further configured to support the wheel 210. The caster assembly 144a includes a post section 232. The post section 232 has a first section 233a, a second section 233b, a first end 234 and a second end 236. The post section 232 will be further described below.

Figure 5:
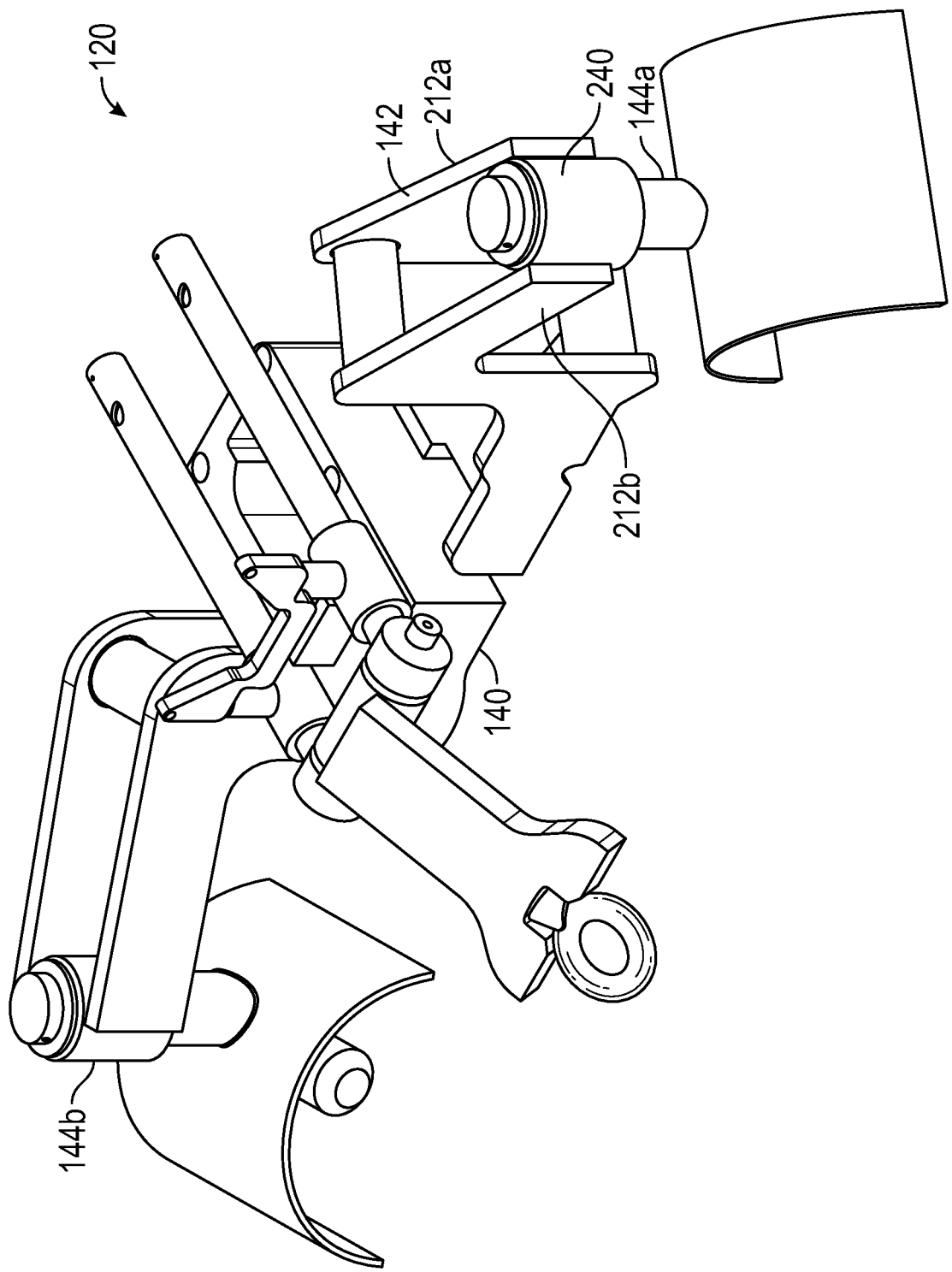
FIG. 5 is side perspective view of a pallet jack assembly of the modified pallet jack of FIG. 2.

Referring again to FIG. 9, the caster assembly 144a also includes a second bearing 238, a second guide member 240 and a fender section 242. The second guide member 240 is attached to the extension arm 228 of the frame assembly 142a as shown in FIG. 5. In the embodiment illustrated in FIG. 5, the second guide member 240 is attached to the extension arms 228, 230 by welding, however, other manners and structures can be used to attach the second guide member 240 to the extension arms 228, 230. The second guide member 240 includes an aperture 244 extending therethrough and is configured to receive the second bearing 238 and the first section 233a of the post section 232 in a manner such that the post section 232 can rotate within the second bearing 238. In the illustrated embodiment, the second guide member 240 is formed from one or more metallic materials and has a tubular form. However, in other embodiments, the second guide member 240 can be other structures, mechanisms and devices, such as the non-limiting examples of clips and clamps, sufficient to secure the caster assembly 144a to the corresponding extension arms 228, 230 of the opposing frame assemblies 142a, 142b and facilitate rotational movement of the post section 232.

Referring again to FIG. 9, the second bearing 238 is fitted to the guide member 240 within the aperture 244. The second bearing 238 includes an aperture 246 configured to receive the first section 233a of the post section 232 and further configured to facilitate rotational movement of the post section 232 with reduced axial friction. In the illustrated embodiment, the second bearing 238 is a bronze bearing; however other structures, mechanisms and devices can be used to facilitate rotational movement of the post section 232.

Referring now to FIG. 9, the first section 233a of the post section 232 is configured for insertion into the second bearing 238 and is further configured for rotational movement within the second bearing 238. As the post section 232 is inserted into the second bearing 238, a stop ring 239, connected to the post section 232 limits the axial travel of the post section. The first section 233a of the post section 232 includes an aperture 248 at the second end 236 of the post section 232. The aperture 248 is configured to receive a second stop member 250. In an assembled arrangement, the first section 233a is fixed within the second bearing 238 by the cooperation of the stop ring 239 and second stop member 250. In the illustrated embodiment, the second stop member 250 is a roll pin. In alternate embodiments, the second stop member 250 can be other structures, such as for example the non-limiting example of a clip, sufficient to prevent axial movement of the first section 233a of the post section 232 from the second bearing 238 as the post section 232 rotates within the second bearing 238.

Referring again to FIG. 9, optionally a third bearing 241 can be positioned between the stop ring 239 and the second guide member 240. The thirst bearing 241 can be a thrust bearing and configured to absorb axial forces occurring between the caster assembly 144a and the frame assembly 142. However, it should be appreciated that the third bearing 241 is optional and not required for operation of the pallet jack assembly.

The modified pallet jack 110 provides many benefits, although all benefits may not be available in all embodiments. First, the modified pallet jack 110 facilitates easy movement of loads without the use of more expensive conventional forklift trucks. Second, the modified pallet jacks 110 provide for hand operation or connection to towing vehicles. Third, the modified pallet jacks 110 can be positioned in facility spaces that cannon accommodate forklift trucks having a larger footprint. Fourth, the modified pallet jacks 110 require less maintenance the forklift trucks. Fifth, the modified pallet jacks 110 can be operated with less expense than conventional forklift trucks. Sixth, the spaced apart wheels are configured to provide stability to the modified pallet jack 110 such as to substantially prevent tipping of the modified pallet jack 110. Seventh, the spaced apart wheels are configured to facilitate a faster towing speed of up to 8.0 miles per hour with a load of 3000 pounds and simultaneously provide a sharper turn radius without tipping. Eighth, the retractable tongue assembly 150 provides for manual operation of the modified pallet jacks 110. Ninth, the spaced apart wheel 210 are configured to allow operation of the modified pallet jack 110 without the risk of binding the operator within the modified pallet jack 110.

Referring now to FIGS. 2, 3, 10 and 11, optionally the modified pallet jack 110 is equipped with a parking brake assembly 260. The parking brake assembly 260 mounts to a lower surface of the support blocks 216a, 216b of the frame assembly 142. When engaged, the parking brake assembly 260 is configured to substantially prevent rolling movement of the modified pallet jack 110.

Figure 10:
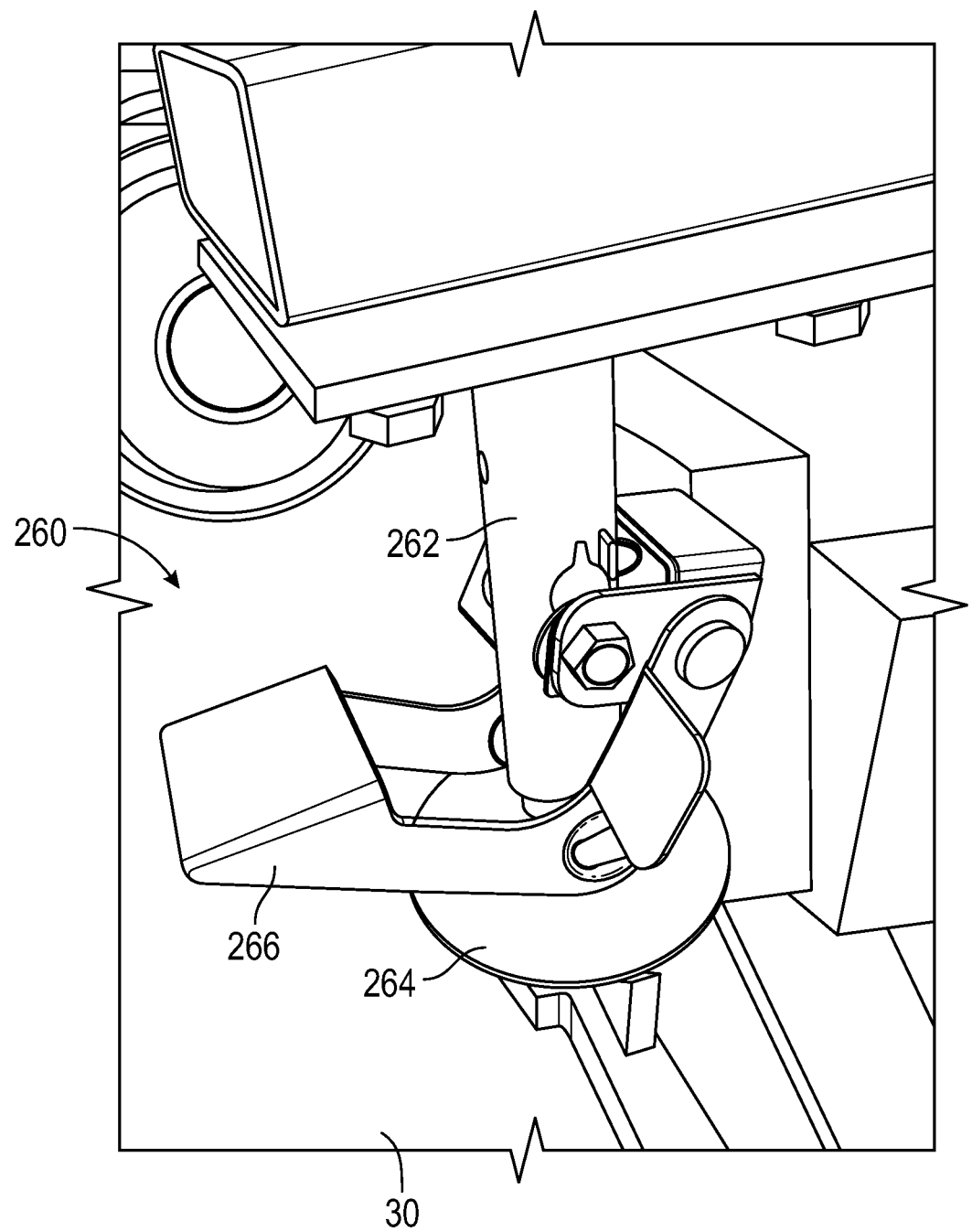
FIG. 10 is a side perspective view of an optional parking brake of the modified pallet jack of FIG. 2, shown in a first, non-engaged orientation.

Referring now to FIG. 10, the parking brake assembly 260 is illustrated. The parking brake assembly 260 includes a brake post 262 configured to support a brake element 264 and a parking brake actuator 266. The parking brake actuator 266 is rotatable between a first, non-engaged orientation and a second, engaged orientation. As shown in FIG. 10, in the first, non-engaged orientation, the parking brake actuator 266 causes the brake element 264 to be free of contact with the surface 30 of the ground.

Figure 11:
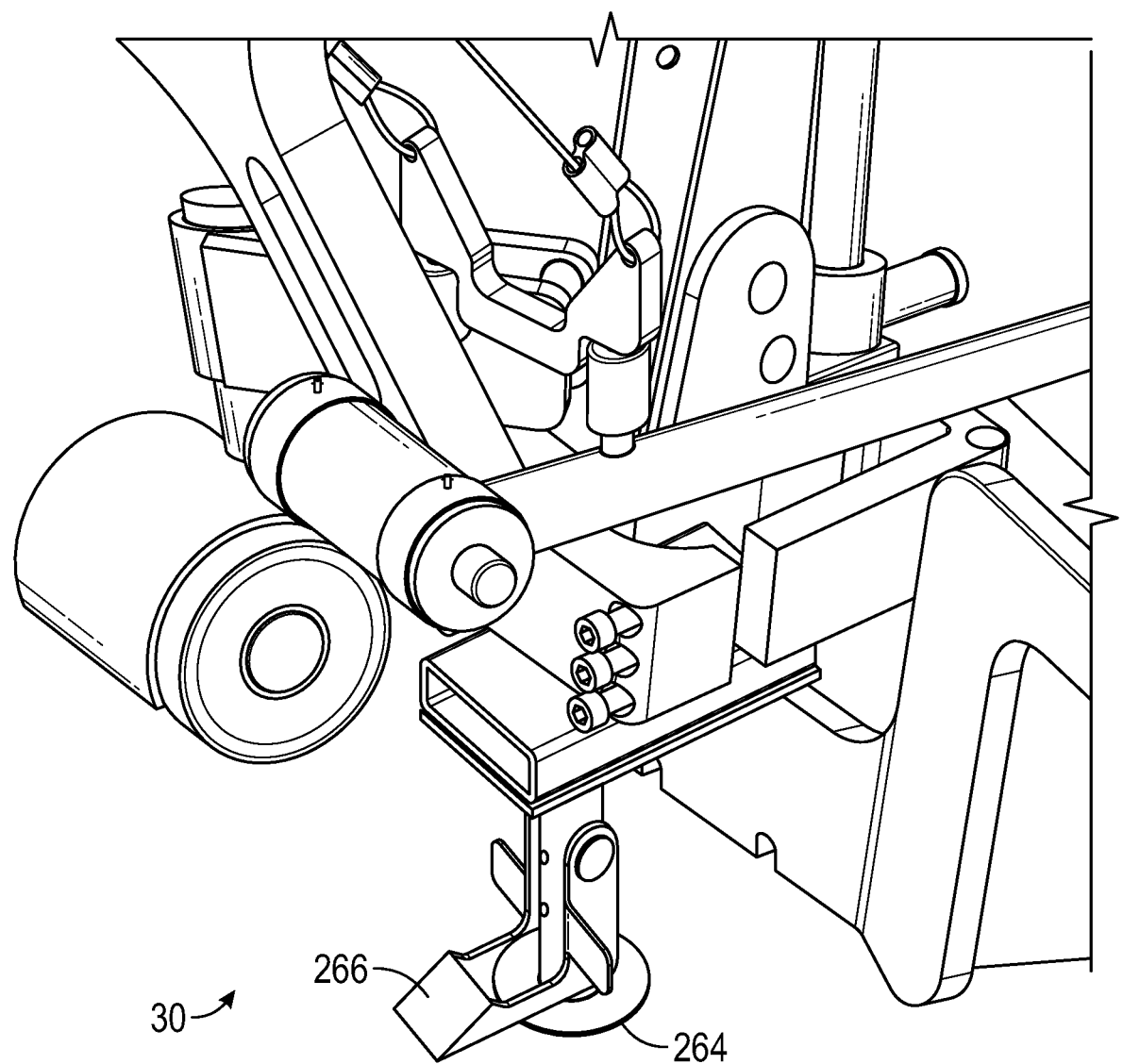
FIG. 11 is a side perspective view of the optional parking brake of FIG. 10, shown in a second, engaged orientation.

Referring now to FIG. 11, in the second, engaged orientation, the parking brake actuator 266 has been engaged, thereby urging the brake element 264 into contact with the surface 30 of the ground. In the embodiment shown in FIGS. 10 and 11, the brake element 264 has the form of a metallic disc. In alternate embodiments, the brake element 264 can have other forms and can be made from other materials sufficient to substantially prevent rolling movement of the modified pallet jack 110 in the second, engage orientation.

Referring again to the embodiment shown in FIGS. 10 and 11, the parking brake actuator 266 has the form of a fulcrum, with rotation of the fulcrum urging the brake element 264 into contact with the surface 30 of the ground. In alternate embodiments, it is contemplated that the parking brake actuator 266 can be other structures, mechanisms and devices, such as for example, a solenoid, sufficient to urge the brake element 264 into contact with the surface 30 of the ground. However, it should be appreciated that the parking brake assembly 260 is optional and not required for successful operation of the pallet jack assembly 110.

In the embodiments shown in FIGS. 1-5, 6A-6C and 7-11, the pallet jack assembly 120 has been applied to a conventional pallet jack 10, thereby resulting in a modified pallet jack 110. Typically, the conventional pallet jack 10 and the modified pallet jack 110 have a standard vertical lift height of the forks 14, 16 in a range of about 4.0-5.0 inches. It is within the contemplation of the pallet jack assembly that the pallet jack assembly can be applied to other types of pallet jacks, such as the non-limiting example of scissor-style pallet jack having vertical lift heights much higher than about 4.0-5.0 inches. In certain instances, it is conceived that the pallet jack assembly could be applied to scissor-style pallet jacks having vertical lift heights of 36.0 inches or more and provides the same benefits as described above.

Figure 12:
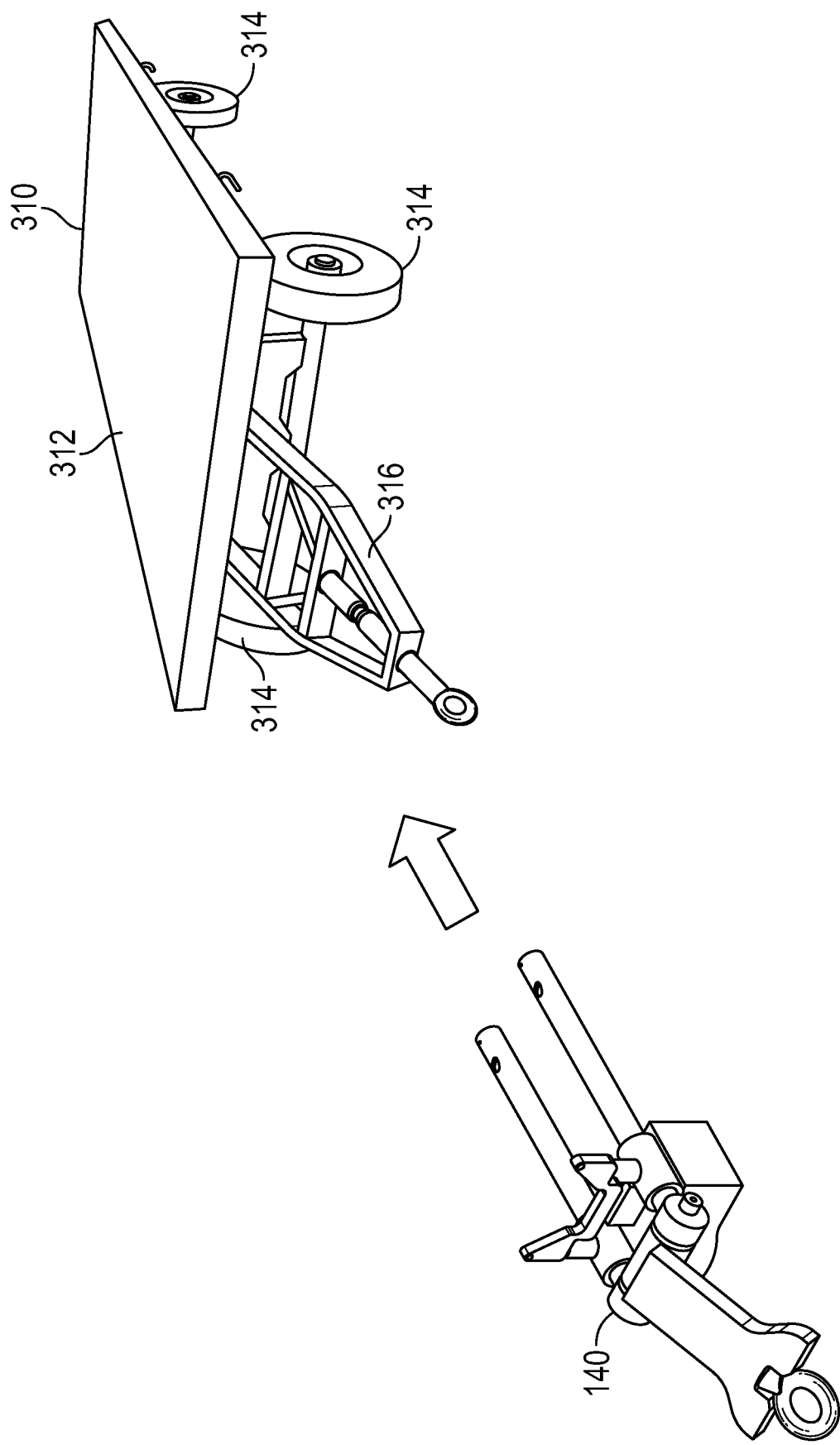
FIG. 12 is a perspective view of an alternate embodiment of a tug assembly.

It is contemplated that portions of the pallet jack assembly 120 can be utilized in manners other than as shown in FIGS. 1-5, 6A-6C and 7-11 and as described above. Referring now to FIG. 12, an industrial dolly 310 is illustrated. The industrial dolly 310 can be used for industrial operations, such as the non-limiting example of conveying parts and equipment about a manufacturing facility. The industrial dolly 310 includes a platform 312 supported by a plurality of wheels 314 or casters. While in the illustrated embodiment, the industrial dolly 310 does not include sides extending in an upward direction from the platform, in other embodiments, the industrial dolly 310 can include sides. The industrial dolly 310 includes a towing structure 316 that facilitates turning of the wheels 314 adjacent to the towing structure 316. It is contemplated that a tug assembly 140, as shown in FIG. 6A can be configured to replace the towing structure 316, thereby advantageously providing the same benefits described above. In certain embodiments, the tug assembly 140 can be fitted to the industrial dolly 310 without significant modification. However, in certain embodiments, the tug assembly 140 may need modification for fitment to the industrial dolly 310. In the instances that the tug assembly 140 is modified, not all benefits described herein may be available.

It is further contemplated that the pump unit 24 of the pallet jack assembly 120 can be fitted with a power assist assembly. The power assist assembly is configured to facilitate lifting of the forks 14, 16 in an easier manner. The power assist assembly can employ mechanisms, such as the non-limiting example of a power assist pump and can be powered by on-board power supplies such as for example one or more batteries.

The principle and mode of operation of the pallet jack assembly have been described in certain embodiments. However, it should be noted that the pallet jack assembly may be practiced otherwise than as specifically illustrated and described without departing from its scope.

What is claimed is:

1. A pallet jack assembly for use with a pallet jack, the pallet jack assembly comprising:
   a tug assembly configured for attachment to a towing vehicle, the tug assembly including a plurality of arm assemblies configured for a first, contracted orientation and a second, extended orientation, each of the arm assemblies including a slide segment configured for axial movement within a first guide member;
   a frame assembly configured to support the tug assembly; and
   a plurality of caster assemblies supported by the frame assembly, each of the caster assemblies configured to support a wheel;
   wherein the pallet jack assembly facilitates use of the pallet jack as a hand-powered pallet jack or for towing by a towing vehicle.

2. The pallet jack assembly of claim 1, wherein the pallet jack includes one or more forks having a vertical lift height in a range of about 4.0-5.0 inches.

3. The pallet jack assembly of claim 1, wherein each of the first guide members includes a first bearing positioned between the slide segment and an interior surface of the first guide member.

4. The pallet jack assembly of claim 1, wherein a first stop member extends through the slide member and is configured to prevent axial movement of the slide member past the first guide member.

5. The pallet jack assembly of claim 1, wherein the frame assembly includes spaced apart side frames.

6. The pallet jack assembly of claim 5, wherein each of the side frames includes a center section, opposing riser sections extending from the center section and opposing extension arms extending from the opposing riser sections.

7. The pallet jack assembly of claim 5, wherein a plurality of spacing members are configured to spaced apart the side frames.

8. The pallet jack assembly of claim 5, wherein a plurality of support blocks are positioned between the side frames and configured for attachment to the tug assembly.

9. The pallet jack assembly of claim 8, wherein each of the second guide members includes a second bearing positioned between the post section and an interior surface of the second guide member.

10. The pallet jack assembly of claim 8, wherein the post section includes a first section that is offset from a second section.

11. The pallet jack assembly of claim 8, wherein the first section of the post section is fixed within the second bearing.

12. The pallet jack assembly of claim 1, wherein each of the caster assemblies includes a post section configured for rotational movement within a second guide member.

13. The pallet jack assembly of claim 1, further including a parking brake assembly configured to substantially prevent rolling movement of the pallet jack equipped with the pallet jack assembly.

14. The pallet jack assembly of claim 1, wherein each of the guide members includes a bearing positioned between the slide segment and an interior surface of the guide member.

15. A pallet jack assembly for use with a pallet jack, the pallet jack assembly comprising:
   a tug assembly configured for attachment to a towing vehicle, the tug assembly including a plurality of arm assemblies configured for a first, contracted orientation and a second, extended orientation;
   a frame assembly configured to support the tug assembly; and
   a plurality of caster assemblies supported by the frame assembly, each of the caster assemblies configured to support a wheel;
   wherein the pallet jack assembly facilitates use of the pallet jack as a hand-powered pallet jack or for towing by a towing vehicle and wherein each of the arm assemblies includes a bushing configured to support a tongue assembly for rotation.

16. The pallet jack assembly of claim 15, wherein the tongue assembly includes a plurality of opposing nubs configured for insertion into the bushing of each of the arm assemblies.

17. A tug assembly configured for attachment to a dolly, the tug assembly comprising:
   a plurality of arm assemblies;
   a bushing connected to each of the arm assemblies; and
   a tongue assembly having a plurality of opposing nubs configured for insertion into the bushing of each of the arm assemblies, the tongue assembly supported for rotation by the bushings;
   wherein each of the arm assemblies is configured for a first, contracted orientation and a second, extended orientation.

18. The tug assembly of claim 17, wherein each of the arm assemblies includes a slide segment configured for axial movement within a guide member.

* * * * *